Sept. 1, 1964  J. WALSH  3,146,840
POWERED ENDLESS TRACK SNOW SLED
Filed July 13, 1959
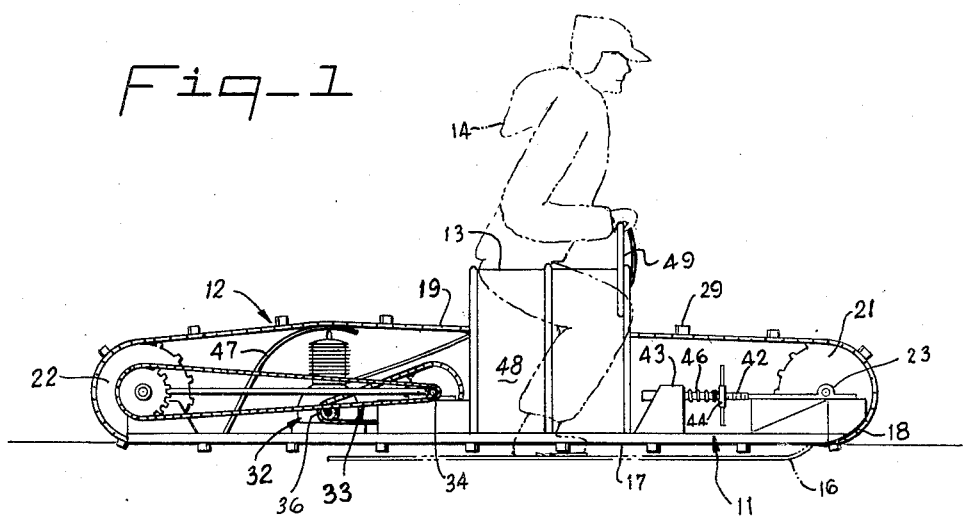
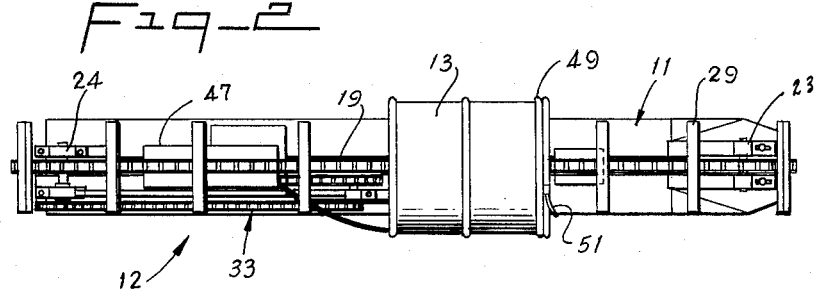
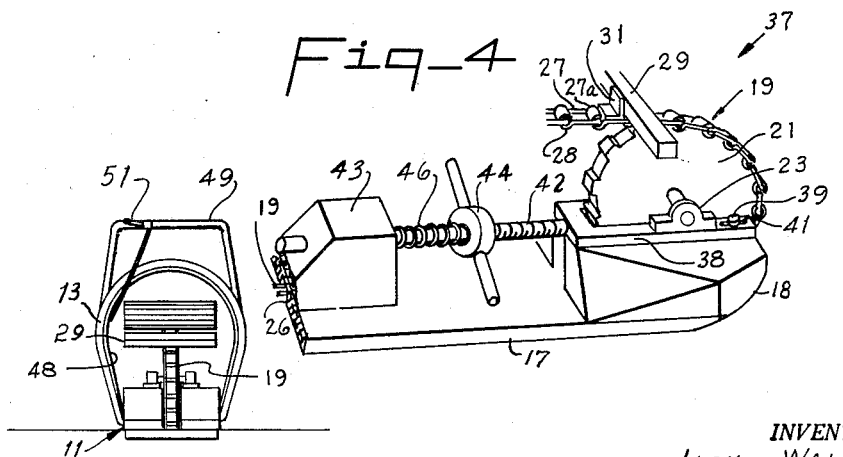
INVENTOR.
JACK WALSH
BY
ATTORNEY

United States Patent Office 3,146,840
Patented Sept. 1, 1964

3,146,840
POWERED ENDLESS TRACK SNOW SLED
Jack Walsh, 519 6th St., Eureka, Calif.
Filed July 13, 1959, Ser. No. 826,826
6 Claims. (Cl. 180—5)

This invention relates to improvements in a powered snow sled, and more particularly to a self-contained vehicle adapted to propel itself and a rider across wintery terrain.

The present device is intended for use by skiers in traveling cross-country over both flat and hilly territory with the sled doing all of the hard work. Such a vehicle is particularly suited for use by persons who have to traverse remote areas not served by roads and highways, such as timber cruisers, telephone and electrical linemen, trappers, snow cruisers and the like.

For use in trackless and sometimes rugged country, it is essential that the vehicle be compact and maneuverable. It should be as narrow as possible in order to pass between close-set trees and rocks, and must be completely controllable in order to avoid uncontrolled skids and sliding.

Previous attempts to provide such a vehicle have proven unsatisfactory because of failure to meet one or more of the recited conditions. One serious defect has been in the means for steering the vehicle. Steering devices have commonly taken the form of an articulated runner, a rudder-like snow-engaging member or short ski-like outriggers. The first two devices do not steer well, and the outriggers extend too far to the sides and are extremely complicated and delicate in structure.

The powered sled of the present invention circumvents the steering problem by eliminating extraneous steering devices. The skier sits astride the machine and guides it by shifting his weight and by tipping and angling his skis in the manner commonly called "snowplowing." Thus, no additional guide or steering means is needed, and, if a narrow passage is encountered, the rider can draw his skis close to the vehicle or even remove them.

It is therefore an object of the present invention to provide a powered snow sled adapted to support and propel a skier, the sled being formed and proportioned for steering by the skis of the operator.

Another object of the present invention is the provision of a powered snow sled which is completely controllable as to both speed and direction so as to prevent skidding or sliding on the snow.

A further object of the invention is to provide a novel drive for a powered snow sled which is flexible, easily repaired and not subject to freezing up when the sled stands for a period of time.

A still further object of the invention is to provide a sturdy and lightweight powered snow sled of the character described in which the moving parts are readily available to the inspection of the operator at all times.

And finally, it is proposed to provide a powered sled of the character described in which the operating controls consist of a single manually engageable lever positioned at the handgrip for easy operation by a mittened hand.

Further objects and advantages of my invention will appear as the specification proceeds, and the new and useful features of my powered snow sled will be fully defined in the claims attached hereto.

The preferred form of my invention is illustrated in the accompanying drawing, forming part of this application in which:

FIGURE 1 shows a side elevational view of a powered snow sled constructed in accordance with the present invention;

FIGURE 2, a plan view of the snow sled of FIGURE 1;

FIGURE 3, a front elevational view of the snow sled of FIGURE 1; and

FIGURE 4, an enlarged fragmentary detail view of a portion of the drive chain and attached cleat.

While I have shown only the preferred form of my invention, it should be understood that various changes or modifications may be made within the scope of the claims hereto attached, without departing from the spirit of the invention.

Referring to the drawing in detail, it will be seen that my powered snow sled consists basically of an elongated snow runner 11, power means 12 on the runner adapted to engage and thrust against the snow for moving the runner thereover, and a seat 13 mounted on the runner, the seat being formed to support a ski-shod operator 14, shown in phantom lines in FIGURE 1, astride the seat, and with his skis 16 riding on the snow on opposite sides of the runner 11 for controlling the direction of travel of the vehicle.

The runner 11 may be made of wood or light metal construction and is of elongated form, having a generally flat bottom 17 and an upcurved front end 18. The length to width ratio of the runner is important. The runner must, of course, have sufficient area to support the weight of the vehicle and rider in soft snow.

If the runner is too wide for its length, it will be very difficult to maneuver with the ski-shod feet of the rider, and will be too wide to pass through constricted space. If the runner is too narrow, it will also be much too long, and, in addition to being reluctant to make sharp turns, will be liable to breakage when traversing rough terrain.

It has been found that a length to width ratio of about eight to one is best suited to present purposes, and that a runner of approximately one foot width and eight feet in length will operate in a very efficient manner.

The power means 12 includes a continuous drive chain 19 entrained around sprocket pulleys 21 and 22, which are journaled in bearings 23 and 24 located at the opposite ends of the runner 11. As may be seen in FIGURES 2 and 3, the chain 19 lies in a vertical plane which coincides with the longitudinal centerline of the runner 11, with the upper horizontal course of the chain passing in spaced relation above the runner and the lower horizontal course of the chain passing through a longitudinal groove 26 cut into the runner 11.

This structure cooperates with the structure of the chain to substantially prevent freezing up. As may be seen from FIGURE 4, the chain 19 is formed of a series of a flat, square links 27, each of which has a hook portion 28 pivotally engaging the next link in such a manner that it may be disconnected by flexing and sliding sideways. This permits easy replacement of links, and the pivoting connection is less likely to freeze up than other types of chains.

A plurality of cross cleats 29 are secured at spaced intervals along the chain 19 in position to sweep along the bottom of the runner 11. As shown in FIGURE 4, the cleats are attached to ears 31 formed on special links 27A. The cleats 29 may be constructed of wood or metal, and, if desired, a rubbing layer of slippery plastic, such as Teflon, may be provided thereon.

Since the chain 19 travels through the groove 26, it is held up out of contact with the snow passing under the runner 11 and has less tendency to pack up and freeze.

The chain 19 is driven around the pulleys 21 and 22 by a gasoline engine 32 mounted toward the rear of the vehicle and arranged to drive the rear pulley 22 through a chain drive 33. A conventional countershaft take-up 34 may be provided for the engine.

Preferably, the engine 32 is a conventional air-cooled gasoline engine of the type used to drive small machinery such as lawn mowers, and may have an output of about three and one-half horsepower at 1500 r.p.m. This should be geared down, as through unit 36, to provide a chain speed of approximately five to six miles per hour.

As a feature of the invention, a combination shock-absorbing and drive chain makeup means 37 is provided in the mounting of the front pulley bearing 23. This means includes a bifurcated member 38 which carries the bearing 23 and which is held for sliding movement on the front end of runner 11 by bolts 39 engaged through slots 41 in the legs of member 38.

A threaded rod 42 extends rearwardly from member 38 and passes loosely through a bore formed in a boss 43 projecting upwardly from runner 11. A handled nut 44 is threaded on the rod 42 and a coil spring 46 is compressed between nut 44 and boss 43. The compression on the spring, as adjusted by rotating nut 44, determines the tension on drive chain 19. Moreover, if the pulley 21 strikes an obstruction, the spring will yield and take up the shock, this ability often saving the pulley from being broken.

If the engine 32 extends upwardly higher than the tops of the pulleys 21 and 22, a curved member 47 may be positioned thereover for slidably supporting the drive chain 19.

The rider sits astride the vehicle on the seat 13, which is provided by a shield 48 of inverted U-shape, mounted just forward of the center of the runner, see FIGURES 1 and 2. This shield surmounts the chain 19 and protects the rider's legs from the rapidly traveling cleats on the drive chain, affording a comfortable seat with a minimum of weight.

As previously pointed out, steering is effected by shifting the weight from side to side and snowplowing the skis. To facilitate this, a handle 49 is fixedly mounted at the front end of the shield 48 in the position shown in FIGURE 1.

Easy control of the machine in frigid weather with mittened hands is provided by the fact that only a single movable control, the throttle lever 51, is needed, and that is mounted on the handle 49. Thus, the operator can control the speed of the machine without taking his hands from the handle and consequently can devote his full attention to the terrain being crossed.

I claim:

1. A snow vehicle, comprising a single non-articulated runner having a length and width substantially the same as the full length and width of the entire vehicle and having a flat bottom and an upcurved front end, said runner having a length to width ratio of substantially 8 to 1, power means on said runner adapted to engage and thrust against the snow for moving the runner thereover, said power means including a continuous chain entrained around pulleys at the opposite ends of said runner and with the lower reach of the chain extending the full length of the runner along the longitudinal centerline thereof, a plurality of cross cleats secured to said chain and extending across the full width of the runner in position to slide along the length of the bottom of said runner, and a seat on said runner surmounting the upper reach of said chain, said seat and runner being proportioned to support a ski-shod operator astride the seat with his skis riding on the snow on opposite sides of the runner for controlling the direction of travel of the vehicle.

2. A snow vehicle, comprising a single non-articulated elongated runner having a flat bottom and an upcurved front end, said runner extending over substantially the full width of the vehicle and having a length to width ratio of substantially 8 to 1, the flat bottom of said runner being formed with a downwardly facing groove along its longitudinal centerline, a pair of pulleys mounted for rotation in a vertical plane lying on the longitudinal centerline of the runner, a continuous chain entrained around said pulleys to provide an upper horizontal reach passing in spaced relation above said runner and a lower horizontal reach passing through said groove, a plurality of cleats extending across the full width of the runner and secured to said chain in position to sweep across the complete under surface of said runner upon movement of said chain around said pulleys, motive means connected to one of said pulleys for rotating the latter so as to drive the chain, an inverted U-shaped shield supported on said runner in overlying relation to the upper reach of said chain and providing a seat proportioned to support a ski-shod operator astride the seat and with his skis riding on the snow on opposite sides of the runner for controlling the direction of travel of the vehicle.

3. A snow vehicle as described in claim 2 and wherein a manually engageable handle is fixedly mounted forwardly of said seat and the center of gravity of the vehicle whereby the operator may support his weight on his skis and swing the vehicle by means of said handle for negotiating sharp turns.

4. A snow vehicle as described in claim 3 and wherein said motive means comprises a gasoline engine operatively connected to the rear pulley, and a throttle control for said engine mounted on said handle.

5. A snow vehicle, comprising a single elongated non-articulated snow runner having a width substantially the same as the full width of the vehicle, power means including a central chain extending the full length of the runner and cleats on said runner extending across the full width of the runners, said cleats adapted to engage and thrust against the snow for moving the runner thereover, and a seat mounted on said runner, said seat and runner being proportioned to support a ski-shod operator astride the seat and with his skis riding on the snow on opposite sides of the runner for controlling the direction of travel of the vehicle, said runner having a width-to-length ratio of approximately one to eight whereby said runner may be made narrow enough for the operator's skis to ride on the snow on opposite sides thereof while still providing a snow-engaging area sufficient to support the weight of the operator and vehicle.

6. A snow vehicle as described in claim 5 wherein said runner has a width of approximately one foot and a length of approximately eight feet.

References Cited in the file of this patent

UNITED STATES PATENTS

| | | |
|---|---|---|
| 122,850 | Parvin | Jan. 16, 1872 |
| 1,176,053 | Handeland | Mar. 21, 1916 |
| 1,280,044 | Knisley | Sept. 24, 1918 |
| 1,367,820 | Knaggs | Feb. 8, 1921 |
| 1,631,114 | Anderson | June 7, 1927 |
| 1,650,334 | Eliason | Nov. 22, 1927 |
| 1,916,375 | Knickerbocker | July 4, 1933 |
| 2,702,088 | Klimek | Feb. 15, 1955 |
| 2,726,903 | Arps | Dec. 13, 1955 |
| 2,846,017 | Luchterhand | Aug. 5, 1958 |

FOREIGN PATENTS

| | | |
|---|---|---|
| 201,445 | Austria | Jan. 10, 1959 |
| 118,365 | Switzerland | Jan. 3, 1927 |